US011960815B2

(12) United States Patent
Fink

(10) Patent No.: US 11,960,815 B2
(45) Date of Patent: Apr. 16, 2024

(54) AUTOMATED NETWORK-ON-CHIP DESIGN

(71) Applicant: Arizona Board of Regents on Behalf of the University of Arizona, Tucson, AZ (US)

(72) Inventor: Wolfgang Fink, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 18/092,485

(22) Filed: Jan. 3, 2023

(65) Prior Publication Data

US 2023/0145577 A1 May 11, 2023

Related U.S. Application Data

(63) Continuation of application No. 16/274,173, filed on Feb. 12, 2019, now Pat. No. 11,544,441.
(Continued)

(51) Int. Cl.
*G06F 30/398* (2020.01)
*G06F 30/327* (2020.01)
(Continued)

(52) U.S. Cl.
CPC .......... *G06F 30/398* (2020.01); *G06F 30/327* (2020.01); *G06F 30/33* (2020.01);
(Continued)

(58) Field of Classification Search
USPC ........................................................ 716/133
See application file for complete search history.

(56) References Cited

U.S. PATENT DOCUMENTS

| 2005/0135274 A1* | 6/2005 | Molnar | H04L 41/0806 370/255 |
| 2007/0213046 A1* | 9/2007 | Li | H04W 40/244 455/425 |

(Continued)

OTHER PUBLICATIONS

Fink, "Stochastic Optimization Framework (SOF) for Computer-Optimized Design, Engineering, and Performance of Multi-Dimensional Systems and Processes", SPIE Defense & Security Symposium, (2008) Orlando, Florida; Proc. SPIE, vol. 6960, 69600N ; DOI:10.1117/12.784440.
(Continued)

*Primary Examiner* — Mohammed Alam
(74) *Attorney, Agent, or Firm* — Thomas | Horstemeyer, LLP

(57) ABSTRACT

Various examples are provided related to automated chip design, such as a pareto-optimization framework for automated network-on-chip design. In one example, a method for network-on-chip (NoC) design includes determining network performance for a defined NoC configuration comprising a plurality of n routers interconnected through a plurality of intermediate links; comparing the network performance of the defined NoC configuration to at least one performance objective; and determining, in response to the comparison, a revised NoC configuration based upon iterative optimization of the at least one performance objective through adjustment of link allocation between the plurality of n routers. In another example, a method comprises determining a revised NoC configuration based upon iterative optimization of at least one performance objective through adjustment of a first number of routers to obtain a second number of routers and through adjustment of link allocation between the second number of routers.

19 Claims, 9 Drawing Sheets

Related U.S. Application Data

(60) Provisional application No. 62/629,508, filed on Feb. 12, 2018.

(51) Int. Cl.
*G06F 30/33* (2020.01)
*G06F 30/394* (2020.01)
*G06F 111/06* (2020.01)
*G06F 111/08* (2020.01)
*G06F 119/06* (2020.01)

(52) U.S. Cl.
CPC ........ *G06F 30/394* (2020.01); *G06F 2111/06* (2020.01); *G06F 2111/08* (2020.01); *G06F 2119/06* (2020.01)

(56) References Cited

U.S. PATENT DOCUMENTS

| | | | | |
|---|---|---|---|---|
| 2014/0254388 | A1* | 9/2014 | Kumar | ................ H04L 47/2425 370/235 |
| 2014/0330763 | A1* | 11/2014 | Hunt | ...................... G06N 3/049 706/42 |
| 2015/0036536 | A1* | 2/2015 | Kumar | .................... H04L 45/12 370/254 |
| 2017/0250926 | A1* | 8/2017 | Chen | ..................... G06F 30/394 |
| 2019/0251227 | A1* | 8/2019 | Fink | ........................ G06F 30/33 |

OTHER PUBLICATIONS

Kirkpatrick, et al., Optimization by Simulated Annealing, Science, (1983) vol. 220, pp. 671-680.

Jiang, et al., "A Detailed and Flexible Cycle-Accurate Network-on-Chip Simulator," 2013 IEEE International Symposium on Performance Analysis of Systems and Software (ISPASS), Apr. 2013, pp. 86-96.

Jiang, et al., "Booksim 2.0 user's guide", Stanford University, Mar. 13, 2010.

Binkert, et al., "The gem5 Simulator," ACM SIGARCH Computer Architecture News, May 2011, vol. 39, No. 2, pp. 1-7.

Bienia, et. al., "The PARSEC Benchmark Suite: Characterization and Architectural Implications", Proceedings of the 17th International Conference on Parallel Architectures and Compilation Techniques, Oct. 2008, pp. 72-81.

* cited by examiner

| Core count | 16 and 64 | Core frequency | 2GHz |
|---|---|---|---|
| L1 I&D cache | 32KB | L2 cache per core | 2MB |
| Cache coherence | Decentralized directory based | State machine | MOESI |
| Link latency | Proportional to inter-router-distance | Link bandwidth | 128 bits |

AUTOMATED NETWORK-ON-CHIP DESIGN

CROSS REFERENCE TO RELATED APPLICATIONS

This application is a continuation of co-pending U.S. non-provisional application Ser. No. 16/274,173, filed Feb. 12, 2019, which claims priority to, and the benefit of, U.S. provisional application entitled "Automated Network-On-Chip Design" having Ser. No. 62/629,508, filed Feb. 12, 2018, both of which are hereby incorporated by reference in their entireties.

BACKGROUND

Increases in the computational performance in single-core processors result in proportional increases in power consumption. Thus, the soaring power dissipation has become one of the performance bottlenecks. In contrast, multi-core processors achieve much higher computational power than single-core processors, harnessing the benefits of parallelism of computer tasks. When using several less-powerful small cores, with the ability to compute data simultaneously, the performance is boosted, at least in theory, proportionally to the number of cores with only a linear increase in power consumption.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
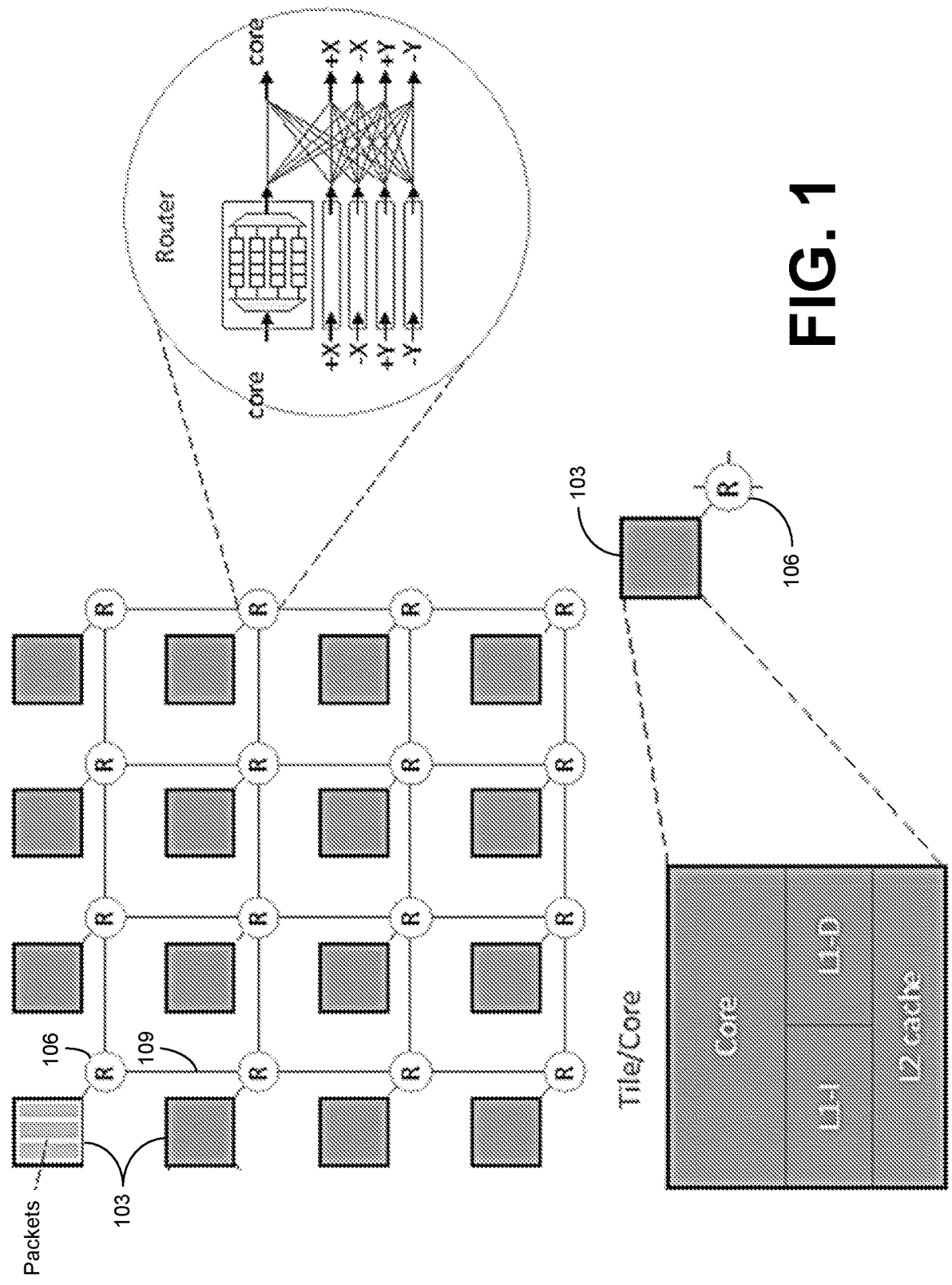
FIG. 1 is a schematic diagram illustrating an example of a 16-core network-on-chip (NoC), in accordance with various embodiments of the present disclosure.

Disclosed herein are various examples related to automated chip design, such as a pareto-optimization framework for automated network-on-chip design. Reference will now be made in detail to the description of the embodiments as illustrated in the drawings, wherein like reference numbers indicate like parts throughout the several views.

With the advent of multi-core processors, network-on-chip design has been key in addressing network performance, such as bandwidth, power consumption, and communication delays when dealing with on-chip communication between the increasing number of processor cores. As the number of cores increases, network design becomes more complex. Due to the rapid increase in number of multiple cores, the data movement among all cores and memories forms an important issue. To keep improving the system performance, network-on-chip (NoC) design has gained considerable attention in recent years. Traditionally, linking all cores with a shared bus, through parallel electrical wires, causes serious congestion because every core uses the same link to transmit and receive data. Although there are many existing network topologies allocating resources with different pros and cons, most of them cannot be scaled efficiently to interconnect hundreds of cores on a chip. Therefore, many on-chip high-radix network topologies that feature low latency and better scalability have been examined.

Implementing a well-designed network is important to meet the heavy-load bandwidth needs of multi-core processors. In addition to the communication bandwidth, network performance, e.g., in terms of latency and power consumption and/or other performance parameters, is affected by the chosen network topology. For example, by adding additional bypass links to a network it is possible to simultaneously reduce latency and power consumption when connecting two critical routers. Even if two network designs have an identical aggregate bandwidth, the latency and power performances may differ significantly, strongly depending on the respective link allocations. Therefore, computer aid in determining network configurations that afford optimal performance given resources and design constraints offers certain advantages. In light of the above, a Pareto-Optimization Framework (POF) is disclosed as an automated design tool for NoCs that explores different combinations of network configurations to determine link allocations to optimize network performance.

The Pareto-optimization framework can explore the space of possible network configurations to determine optimal network latencies, power consumption, and the corresponding link allocations to arrive at low-latency and power-efficient NoC architectures. This Pareto-optimization framework is an instantiation of a Stochastic Optimization Framework (SOF) discussed in "Stochastic Optimization Framework (SOF) for Computer-Optimized Design, Engineering, and Performance of Multi-Dimensional Systems and Processes" by W. Fink (SPIE Defense & Security Symposium; Proc. SPIE, Vol. 6960, 69600N, 2008), which is hereby incorporated by reference in its entirety. For a given number of routers and associated link allocations, average network latency and/or power consumption as examples of performance objectives can be displayed in form of Pareto-optimal fronts, thus not only offering a design tool but also enabling trade-off studies.

Network-on-Chip (NoC). Referring to FIG. 1, shown is a schematic of an example of a small 16-core NoC. Each core 103 generates flits (i.e., smaller pieces of a packet) and transmits them to one designated router 106. Most flits usually have to pass through a few intermediate links 109 and routers 106 from a source node to a destination node because it is impractical and not cost-effective to implement a network that is fully connected with $n(n-1)/2$ links 109, where n is the number of routers 106. Each router 106 puts the receiving flits in buffers, waiting for the switch to direct them to the output to the destination node. Links 109 are the connections between core-to-router and router-to-router, having parameters, such as latency and length, based on the physical inter-router distances on a chip. The activity of all components can be recorded to calculate the total power consumption.

Deterministic Routing Protocol. The routing paths to send packets between any two routers 106 can be determined in advance. One of the most commonly used deterministic routing protocols is shortest path routing: Packets follow the paths that have the shortest hop count without adapting to the current traffic load. The hop count is the performance unit that can represent the total number of relay routers between any two nodes that a data packet must pass through. The benefits of this protocol are its simplicity and robustness. Other routing protocols are known to those skilled in the art.

Pareto-Optimal Front. Economist Vilfredo Pareto proposed a concept that for any allocation of resources there exists an optimal solution where no further improvement can be made without sacrificing one of the performance objectives in a multi-objective system. Because these performance objectives are usually conflicting, the Pareto-optimal front represents the optimal solution boundary after all performance evaluations, thus enabling trade-off studies. See, e.g., "Visualizing the Pareto Frontier" by A. V. Lotov and K. Miettinen (Springer Berlin Heidelberg, 2008).

Figure 2:
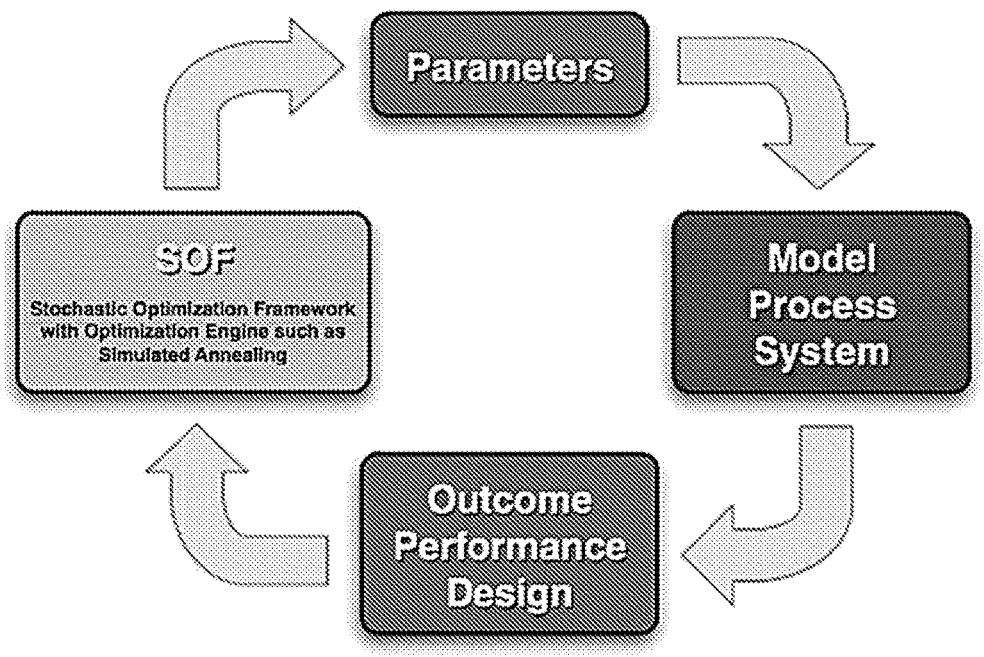
FIG. 2 is a functional schematic diagram of a Stochastic Optimization Framework (SOF), in accordance with various embodiments of the present disclosure.

Stochastic Optimization Framework. FIG. 2 shows the functional schematic of a Stochastic Optimization Framework (SOF). The SOF efficiently samples the parameter space associated with a model, process, or system (1) by repeatedly running the model, process, or system in a forward fashion, and (2) by comparing the respective outcomes against a desired outcome, which results in a fitness measure. The goal of the SOF is to optimize this fitness by using multi-dimensional optimization algorithms, such as simulated annealing, genetic algorithms (GA), evolutionary algorithms (EA), random search, deterministic algorithms, greedy algorithms, Levenberg-Marquardt algorithm, Nelder-Mead algorithm, Simplex algorithm, Downhill Simplex algorithm, multi-dimensional Newton-Raphson method, or gradient descent-based algorithms, as the optimization engine to determine optimal parameter values. One way to determine optimal parameter values is to analytically invert models, processes, or systems, or to run them backwards. However, in many cases—as is the case with NoC design—this is analytically or practically infeasible due to the complexity and high degree of non-linearity of the problem. The SOF overcomes this problem, by effectively "inverting" these models, processes, or systems to determine parameter values that, when applied, yield the desired outcomes, or approximate them as closely as possible.

NoC Pareto-Optimization Framework Setup

A C++ program was developed building upon an open source network simulator BookSim2.0 to explore link allocations and resulting network performance (e.g., latency and power consumption) for any given number of routers on a chip. For details about BookSim2.0 see, e.g., "Booksim2.0 user's guide" by Jiang et al. (Stanford University, March 2010), which is hereby incorporated by reference in its entirety. To quickly iterate the network simulations and evaluate the performance of each configuration, the simulation adopted synthetic traffics (uniform random), instead of real application traffics. Compared to synthetic traffics, real application traffics provide more realistic results, but will take a longer time to evaluate. Furthermore, to efficiently obtain optimal results, instead of searching all combinations exhaustively, the program employed three optimization algorithms that are detailed below:

Random Search (RS);

Special Greedy (SG) as a deterministic optimization algorithm; and

Simulated Annealing (SA) as a stochastic optimization algorithm.

Other optimization algorithms such as, e.g., GA, EA, etc. may also be utilized. The program records all lowest possible network latencies within each power consumption interval, along with the corresponding NoC architectures (i.e., number of routers and associated link allocations) for further analysis.

Figure 3:
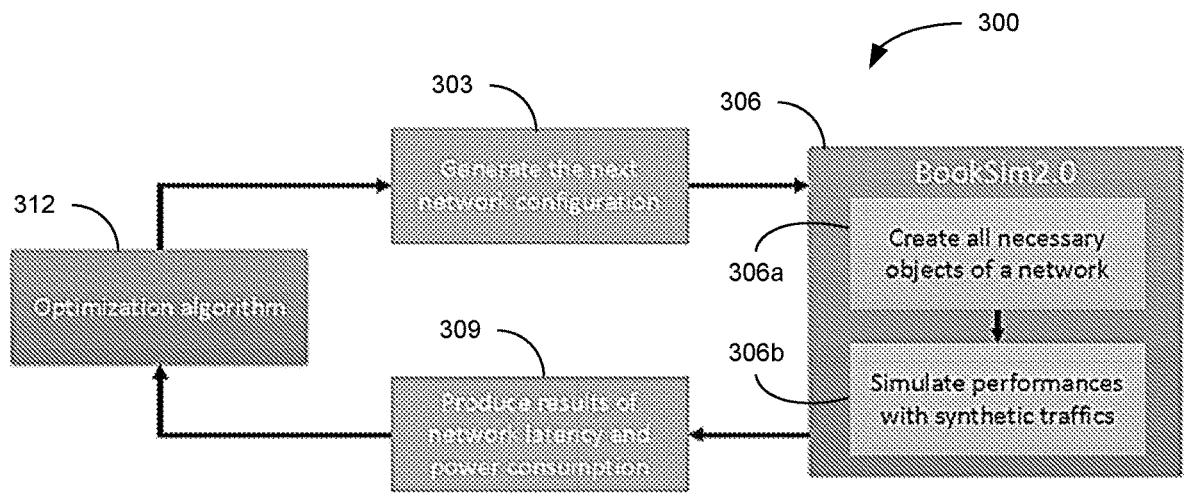
FIG. 3 is a schematic diagram illustrating an example of a Pareto-optimization framework (POF) setup based on the SOF of FIG. 2, in accordance with various embodiments of the present disclosure.

Referring next to FIG. 3, shown is a schematic diagram illustrating a Pareto-optimization framework (POF) setup as an instantiation of a SOF. The overall flow of the example of the POF 300 is illustrated as follows:

1. Once the simulation starts, an initial network configuration is created at 303 by optimization algorithm 312 (e.g., the three optimization algorithms above) and feeds it to the BookSim2.0 simulator at 306.
2. At 306, objects of the network configuration are created (306a) and used to simulate performances with synthetic traffics (306b). The BookSim2.0 simulator starts at 306a by setting up objects of nodes, routers, and links based on the network configuration and begins issuing packets from each node to another at 306b according to a pre-selected traffic pattern.
3. Those packets, generated according to the chosen traffic pattern, are routed from their source nodes to their destination nodes at 306b, e.g., via the shortest paths that are calculated by the deterministic routing protocol.
4. When BookSim2.0 produces the simulation results at 309, the optimization algorithm 312 can create the next network configuration at 303 based on the current and previous performance objective values (e.g., latency and power consumption).
5. The optimization algorithm 312 can store the best latencies for each power interval (or other performance objective values) in a log file.
6. This loop of the POF 300 will keep running until a termination condition is met (e.g., when one or more desired performance objective values are reached or fall within a defined threshold), or a maximum number of iterations is reached or exceeded.

Figure 4:
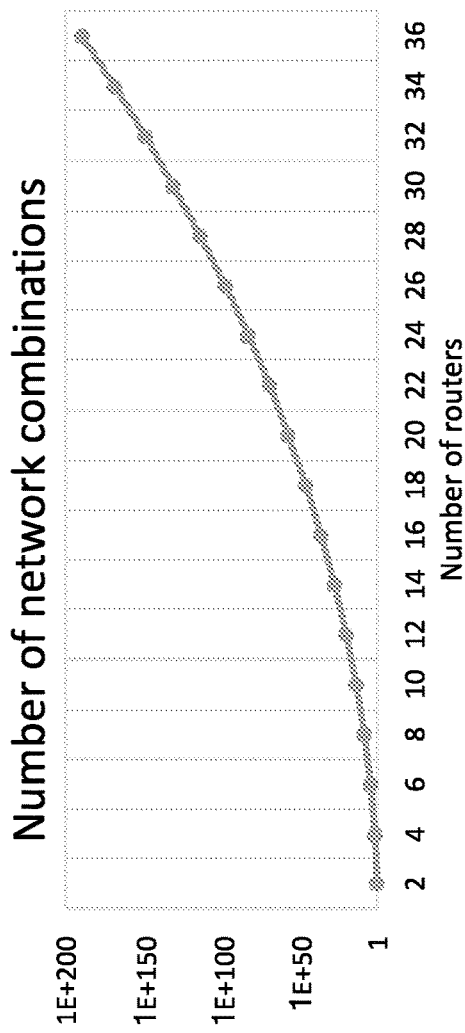
FIG. 4 is a plot illustrating the exponential increase in the total number of network combinations as a function of number of routers, in accordance with various embodiments of the present disclosure.

Given the number of routers 106, the number of possible links 109 can be derived from $n(n-1)/2$, where n is the number of routers. Then, the POF 300 determines the link allocation to form the NoC. The link allocation can be represented by a p-tuple, where p is the number of possible links. The elements of the p-tuple contain 0 and 1, representing absent and present links, respectively. The resulting number of combinations equals $2^{n(n-1)/2}$. For example, the link allocation of a 9-router network is a 36-tuple, resulting in about 69 billion combinations. FIG. 4 shows the number of total network combinations (in logarithmic scale) as the number of routers 106 increases. Therefore, facing this combinatorial explosion, an optimization algorithm to efficiently approximate the optimal result is important. As can be seen from these numbers of combinations, the computations needed to evaluate the optimal NoC configuration necessarily requires a computing environment for processing the information. Moreover, as shown below, the design process improves the performance of the NoC.

The program employs three optimization algorithms:
 a) Random search (RS): This total random search algorithm can give a baseline result for other optimization algorithms to compare against. It is simple to implement. In each loop, it generates a random link allocation, simulates this network configuration, and stores the results in a table if the network is stable and has a better latency than the best NoC encountered so far.
 b) Special greedy (SG): This deterministic algorithm starts from a fully-connected point-to-point network. All links are present and it will obtain the lowest latency of all possible link allocations. It provides the optimal solution in terms of latency with the caveat of a high power consumption. Then, the following iterations explore neighboring networks (e.g., networks that have only one link fewer than the current network) one by one and move to the neighbor that has the minimum latency increase. The algorithm continues until there is no stable neighboring network and no further link can be removed. The greedy algorithm will yield a local minimum eventually because the next location is based on a local condition and the history of deterministic choices. However, it usually has fewer steps for smaller router numbers than other stochastic or non-deterministic algorithms. For example, a 9-router network has 36 possible links and all are present at first. In the first iteration, the program simulates all 36 neighboring networks, which have one link removed. The following iterations simulate from 35, 34, . . . to 9 neighboring networks. No links can be removed when the number of links has reached 8, i.e., n-1. The total number of simulations for this algorithm is $(n^4-2n^3-n^2+2n)/8$, where n is the number of routers 106.
 c) Simulated annealing (SA): This algorithm starts from a random link allocation and keeps moving to neighboring networks based on a stochastic condition until the temperature variable is cooled below a terminating point. The neighboring network is created by flipping at least one random location/link of the current p-tuple of link allocations (i.e., a random element changed from 1 to 0 or vice versa). Then, the decision of either ACCEPT or REJECT the new network is made by comparing the fitness of two networks. The fitness E is the weighted summation between performance objectives (e.g., latency and power). If the new network has a better fitness, the SA algorithm accepts it and moves on, but if it has a worse fitness, the SA algorithm will make a decision based on a Boltzmann-probability:

$$\text{random number } [0 \ldots 1] < \exp[-(E_{temp}-E_{best})/T]$$

where $E_{temp}$ is the new fitness, $E_{best}$ is the best fitness recorded so far, and T is the temperature variable. The temperature is decreasing after each iteration according to a cooling rate ($\lambda$). When the temperature is high, the SA algorithm has a high probability of accepting a worse network, and as the temperature decreases gradually, the probability of accepting a worse network also decreases. Then, only networks with better fitness will be accepted. Therefore, because of the feature of a Boltzmann-probability, simulated annealing can avoid getting stuck in local minima, thus approaching the global minimum—a feature which deterministic algorithms tend not to have.

Further details about the optimization algorithms is provided by "Chapter 7—Link Allocation Pareto-Optimization" by Tzyy-Juin Kao, which is hereby incorporated by reference in its entirety.

In the simulation results below, a start and end temperature as well as a cooling rate $\lambda$ are presented such that the maximum number of iterations is, e.g., about one million (the maximum number of iterations can be user-definable). In addition, the fitness has tunable multi-objective weights to explore the areas of the design space that the user is interested in (e.g., latency and power consumption in this case). For the simulations, the overall fitness of each network design was expressed as a weighted summation equation of latency and power consumption:

$$\text{Fitness } E=\text{weight}\times\text{latency}+(1-\text{weight})\times\text{power}.$$

Because the SA algorithm iterates and converges to one optimal result (lowest fitness) eventually, based on its tunable multi-objective weights in the fitness, the weight parameter was swept from 0.1 to 1 in increments of 0.1 to generate a Pareto-optimal front across a wide range of power consumption. Hence, when the weight is low (0.1 or 0.2), the algorithm explores the leftmost side of the Pareto-optimal front where the power is low, and when the weight increases, it moves to the right gradually where the latency is low. Programs with different weight settings can be executed in parallel on a cluster computer and can record the results simultaneously, generating a Pareto-optimal front at last. Without taking latency into consideration, the simulated annealing may get into unstable networks with diverging latencies. Thus, the weight should not be zero (power only).

Because of the use of BookSim2.0, all resulting networks guarantee that any two routers can be connected through other routers (resulting in no orphans and no isolated groups). While the program keeps simulating different networks, the two performance objectives (latency and power consumption) were monitored for Pareto-optimization analysis. Power consumptions in watts were rounded to the nearest integer (e.g., binned) to reduce the overall data that need to be recorded. Therefore, in each integer power interval, only the minimum latency is recorded.

For BookSim2.0, the latencies (in cycles) of all links are manually assigned since it cannot calculate the time delay for a signal to travel from one end to another of a link based on its length. Therefore, DSENT was used in the simulations to calculate the minimum required latencies for different physical lengths of links in advance. For example, assuming all links on a chip only stretch into horizontal and vertical directions (not diagonal for better layout formatting) and all routers are distributed evenly across the chip (in a tiled architecture), then each inter-router-distance (in rectangular directions) can be derived from the die size and the number of routers. Whenever a link allocation is generated, the program calculates link latencies based on their inter-router-distances, and then creates a complete network configuration for BookSim2.0 to simulate. Other ways of calculating link latencies are possible and known to those skilled in the art. For additional details about DSENT see, e.g., "DSENT—a tool connecting emerging photonics with electronics for opto-electronic networks-on-chip modeling" by Sun et al. (Proc. 6th IEEE/ACM Int. Symp. Netw. Chip (NoCS), May 2012, pp. 201-210), which is hereby incorporated by reference in its entirety.

All network devices were based on a 32 nm CMOS technology and assumed to operate at 5 GHz on a 21×21 mm$^2$ chip for performance analysis. The table below shows the configurations on BookSim2.0. Anynet is one of the topology functions that reads the configuration file. Min routing function is the deterministic routing protocol that generates routing path tables based on the shortest hop counts between routers. Uniform traffic is the random synthetic traffic pattern. All packets are generated randomly based on the injection rate of each router and are sent to a random destination. Sample period is the cycle time of each simulation. In addition, to ensure the network is stable (i.e., generates converging results), every network is simulated at least four times. If one of the results is diverging, the simulator will discard it and run another time. Injection rate is the frequency of a new packet generated by each node.

| Variable: | Value: |
|---|---|
| Topology | anynet |
| Routing function | min |
| Traffic | uniform |
| Sample period | 1000 |
| Injection rate | 0.1 |

Results

Figure 5A:
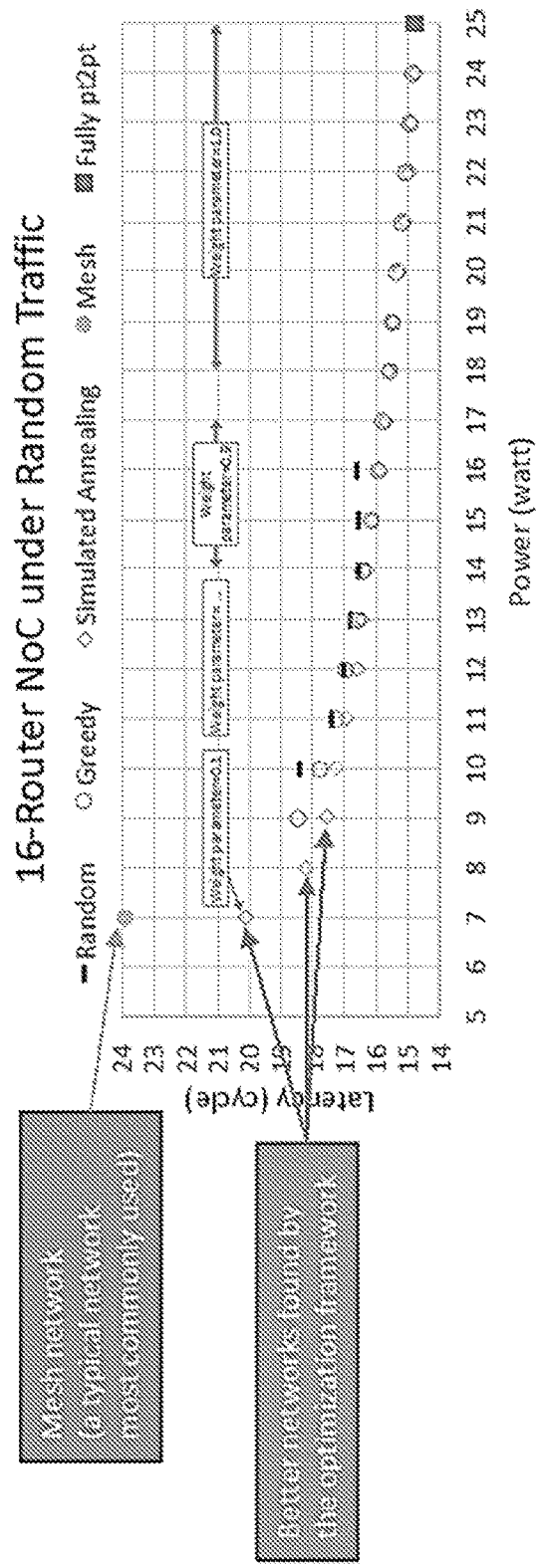
FIGS. 5A, 5B and 5C illustrate examples of Pareto-optimal front results for 16-router networks, 36-router networks and 64-router networks under random traffic respectively, in accordance with various embodiments of the present disclosure.
Figure 5B:
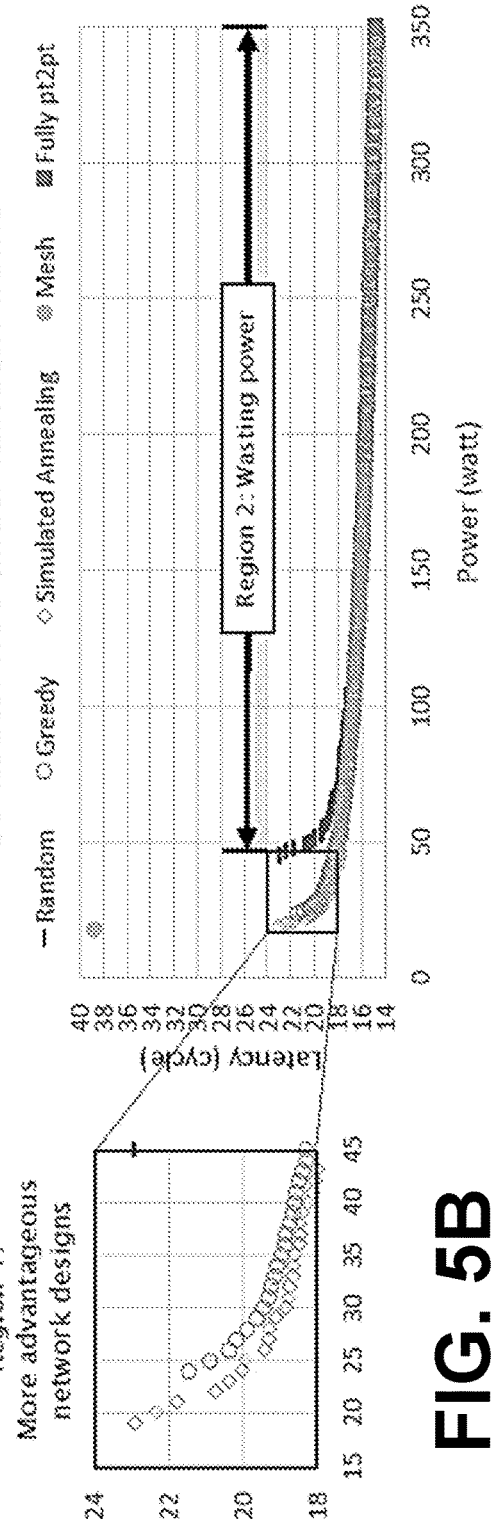
Figure 5C:
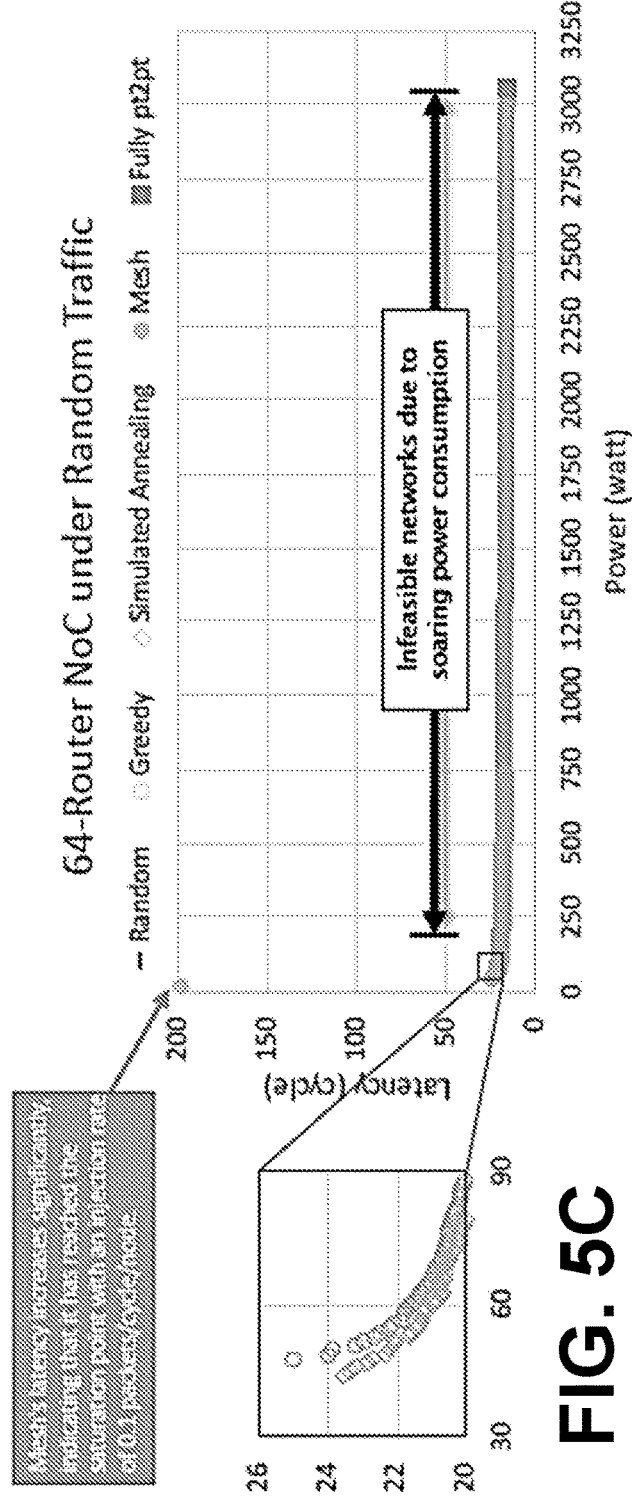

Referring to FIGS. 5A-5C, shown are simulated Pareto-optimal front results for 16-router, 36-router and 64-router networks respectively, under random traffic conditions. In addition to the three optimization algorithms, a mesh network and a fully-connected point-to-point (pt2pt) network were also plotted. The SA algorithm uses different weight parameters (0.1, 0.2, . . . , 1.0) and combines the results to form the Pareto-optimal front. For example, a weight of 0.1 was used for a power of 7, a weight of 0.9 was used for a power of 15, and a weight of 1.0 was used for a power of 22. See the table of FIG. 6.

FIG. 5A shows the Pareto-optimal front between two performance objectives (latency as a function of power consumption) for a 16-router network scenario. First, a POF-designed NoC with lower latency but the same power consumption compared to the well-known mesh network was found. The mesh network consisted of short links only. In contrast, the POF-designed NoC contained some longer links, which reduced the number of relay routers between some routers. The lower number of relay routers resulted in a decrease in latency and power consumption for writing data into the router buffers. The POF was capable of finding the balance between the performance objectives. Second, the simulated annealing algorithm produced better results than the other two algorithms. A fully-connected point-to-point (pt2pt) network was also plotted as a reference to show the lowest possible latency of all networks.

FIG. 5B shows the Pareto-optimal front between two performance objectives (latency as a function of power consumption) for a 36-router network scenario. Because the number of links to form a 36-router network is between 35 to 630, the range of power consumption increases to a maximum of 350 watts (a fully-connected point-to-point network), which is an unaffordable cost for a multi-core processor. When the power consumption increases to about 45 watts, the latency decreases from about 23 to 18 cycles. Hence, those networks (enlarged in the small inset on the left) are more advantageous network designs. When the power keeps increasing, the latency only decreases slightly (a flat Pareto-optimal front), indicating that the rest of the designs are not significantly more efficient because latency does not change much as power consumption increases. On the other hand, the POF-designed NoC also outperformed the mesh NoC, and this gap increased more compared to the 16-router network scenario of FIG. 5A. In addition, simulated annealing still produced better networks than the greedy algorithm, which indicates the greedy algorithm may have gotten stuck in a local minimum.

Figure 6:
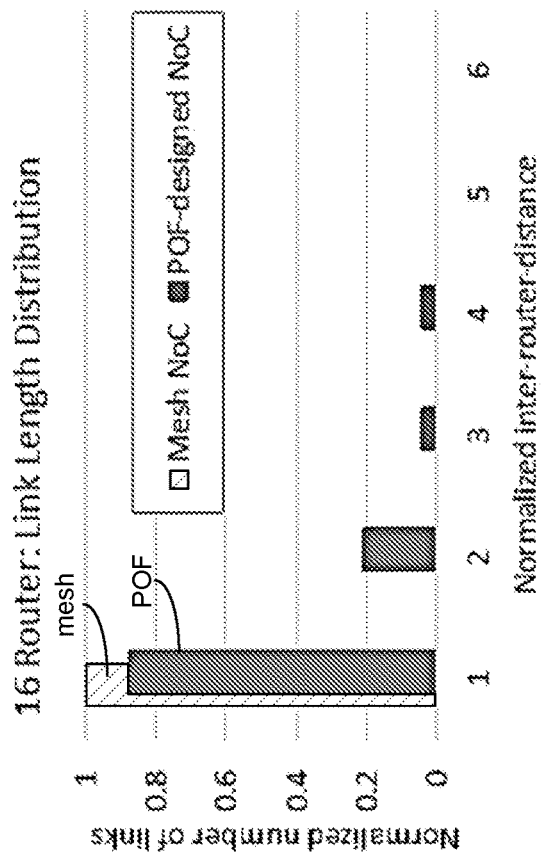
FIG. 6 is a table illustrating examples of weights for a simulated annealing (SA) algorithm to generate Pareto-optimal fronts for the router networks of FIGS. 5A-5C, in accordance with various embodiments of the present disclosure.

FIG. 5C shows the Pareto-optimal front between two performance objectives (latency as a function of power consumption) for a 64-router network scenario. Comparing the mesh network with the lowest-power POF-designed NoC, although the mesh network only used 24 watts while the POF-designed NoC utilized 44 watts, there is a huge latency tradeoff (from about 200 to 24 cycles). The result shows that the mesh network had reached its limitation to accommodate current traffic load and is a poor design based on the Pareto-optimal front. Other networks that use hundreds or thousands of watts are also impractical designs due to the power consumption budget on a single chip. Fully-connected pt2pt network demands the highest power, more than 3000 watts, resulting from placing all 2016 links between any two routers. The weights for the SA algorithm to generate the Pareto-optimal fronts for the 16, 36 and 64-router scenarios, respectively, are shown in the table of FIG. 6.

Figure 7A:
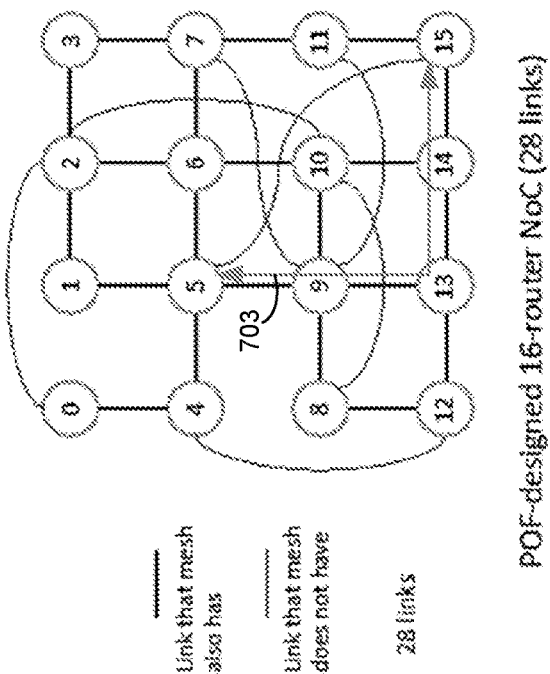
FIGS. 7A, 7B and 7C illustrate examples of POF-designed NoCs and associated link length distributions for 16 routers, 36 routers and 64 routers respectively, in accordance with various embodiments of the present disclosure.
Figure 7B:
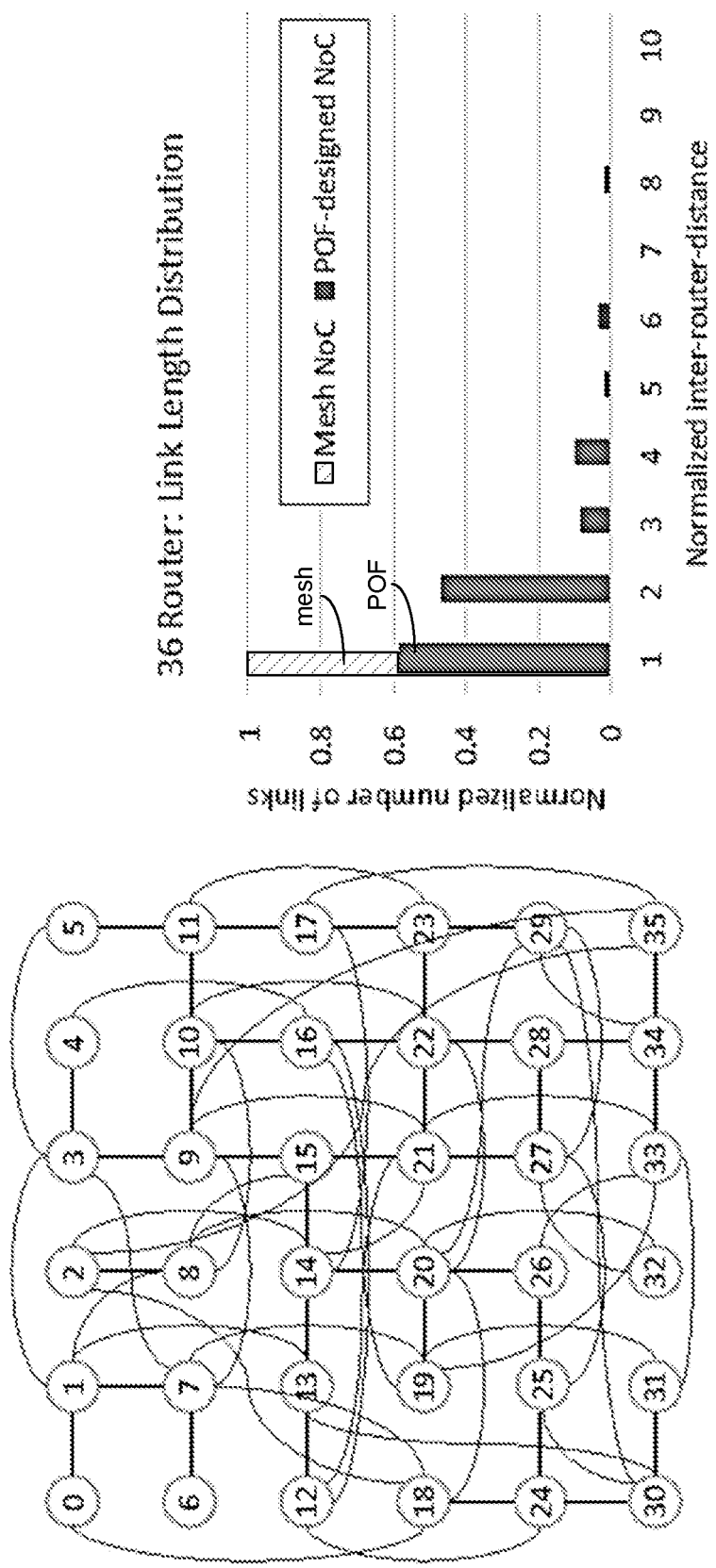
Figure 7C:
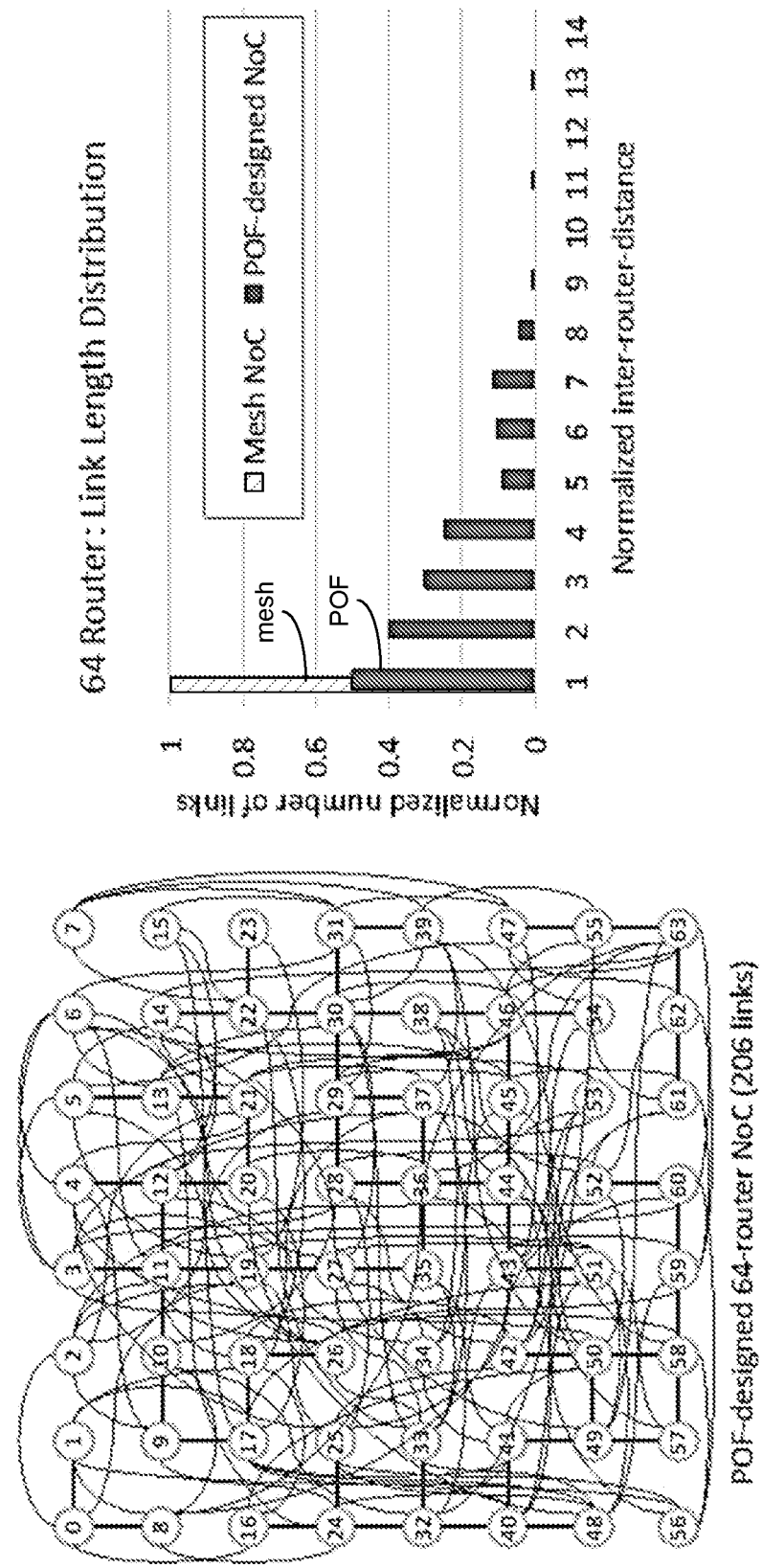

The POF-designed network topologies (with number of routers and associated link allocations) were also recorded during each simulation, allowing for the actual display of their design. The lowest power NoCs found by the SA algorithm were plotted in FIGS. 7A-7C. The straight horizontal and vertical lines between routers represent the links that a mesh network topology has in common, and curved lines between routers represent the opposite to clearly display the differences from the mesh network configuration. FIG. 7A shows the POF-designed NoC for 16 routers, FIG. 7B shows the POF-designed NoC for 36 routers, and FIG. 7C shows the POF-designed NoC for 64 routers. Compared to the mesh network topology, more and longer links are included in the POF-designed NoCs and replace the shortest links as the network becomes larger. The link length distribution histograms in FIGS. 7A-7C illustrate the changes.

FIGS. 7A-7C show the network topologies indicating the connections between the routers, not the actual physical layout of the electric wires. Typically, electric wires are laid-out in horizontal and vertical directions on a chip distributed among multiple metal layers to avoid crosstalk, and wires in different metal layers are connected by vias (vertical interconnect access). For example, the longest link in FIG. 7A, connecting router 5 and router 15, is 4 inter-router-distances long, i.e., 2 inter-router-distances in both horizontal and vertical directions illustrated by arrow 703. Because longer links result in higher power consumption, simulated annealing starting from a random network still converges to a mesh-link network that uses many one-inter-router-distance links to connect neighboring routers. The results also show that the mesh topology has limited scalability because as the number of routers increases, one-inter-router-distance links are no longer efficient in terms of latency and power, and are gradually replaced by longer links (see FIGS. 7B and 7C). When packets are routed, long links lower the latency and reduce the usage of relay routers. The number of routers and/or associated link allocations can be adjusted to meet the performance objectives.

To appreciate, assess, and corroborate the feasibility and quality of the NoC designs found by the introduced Pareto-optimization framework the following has to be emphasized:
1. The BookSim2.0 simulator always guarantees that a network is stable before producing latency and power results. A stable network means that all packets can be sent to the correct destinations within a given (finite) simulation time. Hence, no packet is lost or stuck in the network when following the given routing protocol.
2. The deterministic routing protocol, which always directs packets along the same path between any two routers, is adopted and works properly even for these unconventional and irregular networks that are created by the Pareto-optimization framework. The protocol calculates the minimal paths among routers in advance and follows them even if there are other possible paths. In doing so, any livelock loop (i.e, a packet is traveling around and never reaching the destination) is prevented and at least all path lengths are the shortest. If any deadlock occurs (i.e., some packets hold resources and also request other resources that are held by other packets; if their dependencies form a cycle and none of these packets can proceed, a deadlock is created permanently), the simulator will abort those unstable networks.
3. The BookSim2.0 simulator simulates a network at least four times to make sure a network can produce converging results under different random traffics. Therefore, the simulated network should be robust enough to allow smooth traffic flow without sudden congestion and uneven delay in certain paths, thus lending credibility to the latency results.

The Pareto-optimization framework uses random synthetic traffic to quickly evaluate the latency and power consumption among billions of network combinations. Although more sophisticated multi-core processor simulators exist, such as gem5, they usually are computationally much more expensive than BookSim2.0, such that their incorporation in the Pareto-optimal framework, albeit feasible in principle, is computationally rather unrealistic unless they were amenable to parallelization. Therefore, it is advantageous to use a computationally cheaper simulator, such as BookSim2.0, at first to optimize NoC architectures much more rapidly in an iterative manner, and to subsequently benchmark the resulting optimal POF-designed NoC architectures with a sophisticated and comprehensive NoC simulator, such as gem5 (see the Full System Application Benchmarking section below for justification of this procedure).

Given the quadratic equation of the number of iterations $(n^4-2n^3-n^2+2n)/8$, the special greedy (SG) algorithm is becoming more difficult to complete for larger router numbers. For a 64-router scenario, it already requires 2 million iterations per simulation, i.e., twice the number as the simulated annealing (SA) algorithm, and for a 256-router scenario 532 million iterations, thus becoming impractical to use. In contrast, the complexity of the SA algorithm is based on the user-defined temperature parameters and the cooling rate, i.e., independent of the number of routers. In addition, compared to the SG algorithm, the SA algorithm produces better results within an adjustable finite simulation time.

Full System Application Benchmarking

Although the introduced POF scheme, when using BookSim2.0, has the ability to quickly evaluate large numbers of network combinations and generate a full Pareto-optimal front, these simulations are only conducted under random synthetic traffic as previously discussed. Therefore, to provide detailed evaluations of a system under real-world applications and to validate the POF simulation results, a standard mesh NoC architecture and the lowest-power 16-router POF-designed NoC architecture were simulated and compared using the full system cycle accurate gem5 simulator. For details about gem5 see, e.g., "The gem5 simulator" by Binkert et al. (SIGARCH Comput. Archit. News, vol. 39, no. 2, pp. 1-7, August 2011), which is hereby incorporated by reference in its entirety.

Figures 8, 9:
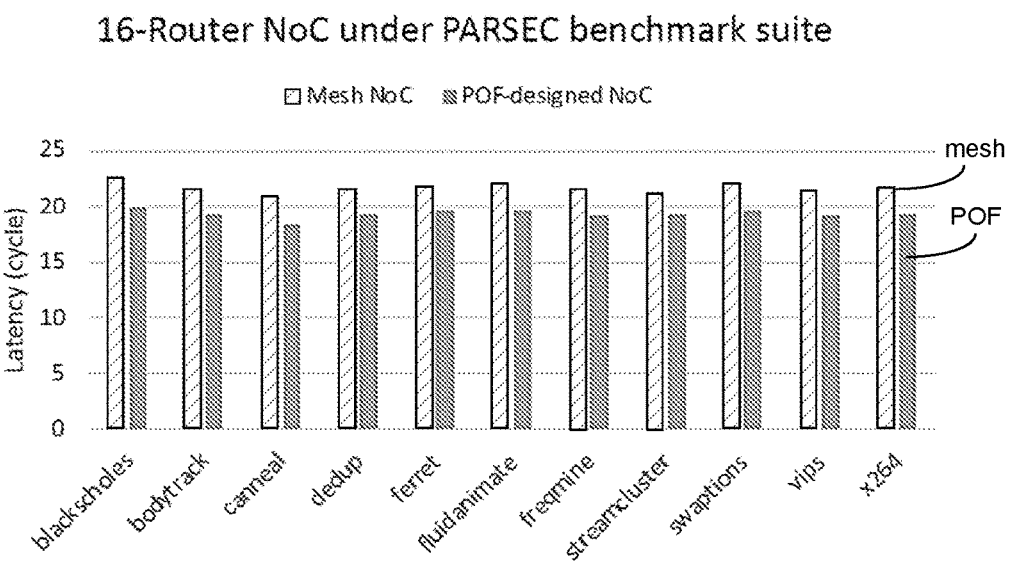
FIG. 8 is a table illustrating the system configuration for a 16-router system for NoC benchmarking, in accordance with various embodiments of the present disclosure.
FIG. 9 is a plot illustrating an example of average network latency comparison between a mesh NoC and a POF-designed NoC, in accordance with various embodiments of the present disclosure.

The gem5 simulator consists of CPU models, a detailed cache/memory system, on-chip interconnection networks (including links, routers, routing protocols, and flow-control), and a variety of cache coherence protocols. In the full system mode, gem5 builds a system based on a configuration input (e.g., the POF-designed NoC) and boots a Linux operating system on it—all in virtual space. Application benchmarks are then executed at runtime of the operating system. The PARSEC benchmark suite was selected for the NoC benchmarking due to its emerging parallel applications, especially for multi-core processors. For details about the PARSEC benchmark suite see, e.g., "The PARSEC Benchmark Suite: Characterization and Architectural Implications" by Bienia et al. (Proceedings of the 17th International Conference on Parallel Architectures and Compilation Techniques, October 2008), which is hereby incorporated by reference in its entirety. The table in FIG. 8 shows the system configuration for the 16-router system simulated on gem5.

The POF-designed NoC custom topology was implemented in gem5 to simulate/assess its average network latency while running the PARSEC benchmark suite. The average network latency comparison between the mesh and POF-designed NoCs using the PARSEC benchmark suite running on a full system cycle accurate gem5 simulator in FIG. 9 shows that the POF-designed NoC exhibits a similar latency reduction compared to mesh NoC when using gem5 (FIG. 9) instead of BookSim2.0 (FIGS. 5A-5C). The traffic loads, generated by the random synthetic traffic and the chosen benchmarks, differ between the two simulators used (i.e., BookSim2.0 and gem5). Thus, the latency results differ quantitatively. However, they are consistent qualitatively. Furthermore, no deadlock occurs and the deterministic routing protocol is also working properly in the full system environment (i.e., gem5). Although mesh-NoCs have the advantage of a much simpler and regular architecture/link layout, the POF-designed NoCs, which are selected from an enormous number of combinations beyond human/manual design abilities, prove to be superior in regard to latency and power consumption, and are implementable and controllable (protocol-wise).

A Pareto-optimization simulation framework that automates the NoC architecture design by adjusting the number of routers and/or the associated link allocations has been devised. When taking inter-router-distance into consideration, it is hard to find an efficient set of short and long links without the aid of a computer, especially in large-scale multi-core systems. Long links consume more power than short links, but they reduce the number of relay routers in a path between two routers, thereby decreasing the latency. Therefore, adding long links at opportune locations can greatly improve overall operation and performance of the NoC. The POF is capable of iterating and exploring the tradeoffs between at least two performance objectives (e.g., latency and power consumption) in form of a Pareto-optimal front. Among the three tested optimization algorithms, the simulated annealing (SA) algorithm is very efficient and exhibits high flexibility because the weights for each performance objective can be fine-tuned to fulfill different application and design needs.

The Pareto-optimization framework shows encouraging results, indicating the capabilities for fully automated NoC design. Additional design parameters such as, but not limited to, load balancing, adaptive routing protocols and photonic links, can be considered and incorporated, also by using potentially more realistic traffic patterns other than random synthetic traffic, to further enhance the scope and quality of the automated NoC designs to meet the exploding need for multi-core systems.

Figure 10:
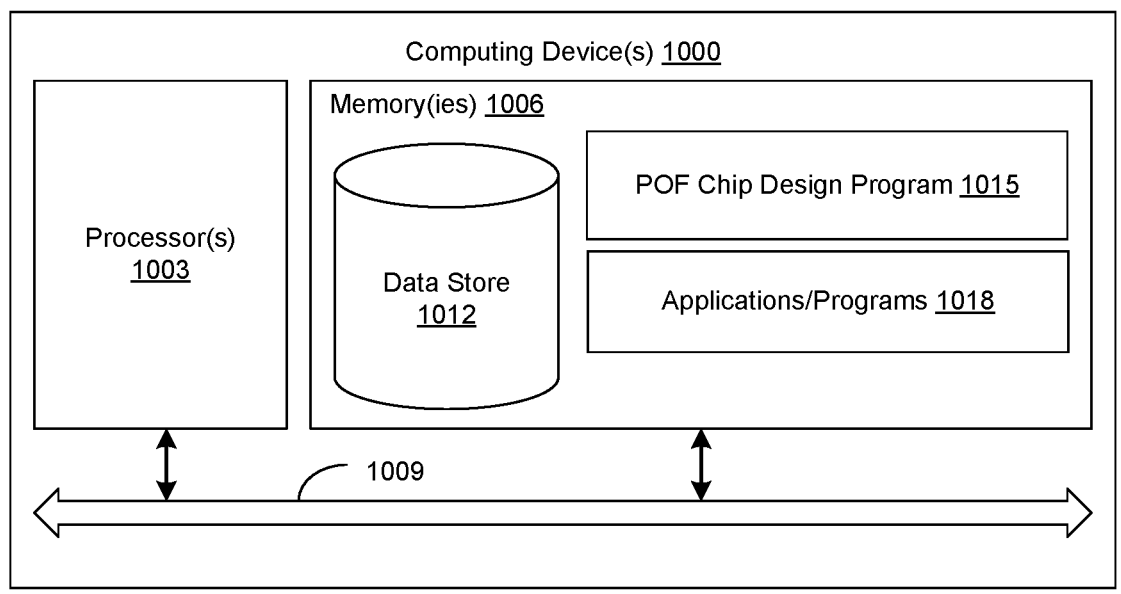
FIG. 10 is a schematic diagram illustrating an example of a computing system for implementing a POF chip design application, in accordance with various embodiments of the present disclosure.

With reference next to FIG. 10, shown is a schematic block diagram of a computing device 1000. In some embodiments, among others, the computing device 1000 may represent a mobile device (e.g. a smartphone, tablet, computer, etc.). Each computing device 1000 includes at least one processor circuit, for example, having a processor 1003 and a memory 1006, both of which are coupled to a local interface 1009. To this end, each computing device 1000 may comprise, for example, at least one server computer or like device, which can be utilized in a cloud based environment. The local interface 1009 may comprise, for example, a data bus with an accompanying address/control bus or other bus structure as can be appreciated.

In some embodiments, the computing device 1000 can include one or more network interfaces. The network interface may comprise, for example, a wireless transmitter, a wireless transceiver, and/or a wireless receiver (e.g., Bluetooth®, Wi-Fi, Ethernet, etc.). The network interface can communicate with a remote computing device using an appropriate communications protocol. As one skilled in the art can appreciate, other wireless protocols may be used in the various embodiments of the present disclosure.

Stored in the memory 1006 are both data and several components that are executable by the processor 1003. In particular, stored in the memory 1006 and executable by the processor 1003 are at least one Pareto-optimization framework (POF) chip design application 1015 and potentially other applications and/or programs 1018. Also stored in the memory 1006 may be a data store 1012 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program or application file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively, such as multicore systems, FPGAs, GPUs, GPGPUs, spatially distributed computing systems (e.g., connected via the cloud and/or Internet). In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the POF chip design application 1015 and other applications/programs 1018, described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the POF chip design application 1015 and other applications/programs 1018, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the POF chip design application 1015 and other applications/programs 1018, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment. Additionally, it is understood that terms such as "application," "service," "system," "engine," "module," and so on may be interchangeable and are not intended to be limiting.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method for network-on-chip (NoC) design, comprising:
   determining, by a computing device, network performance for a defined NoC configuration comprising a plurality of n routers interconnected through a plurality of intermediate links, where n is a number of routers;
   comparing, by the computing device, the network performance of the defined NoC configuration to at least one performance objective; and
   in response to the comparison, determining, by the computing device, a revised NoC configuration based upon iterative optimization of the at least one performance objective through adjustment of link allocation between the plurality of n routers.

2. The method of claim 1, wherein the iterative optimization of the at least one performance objective is a pareto-optimal optimization.

3. The method of claim 1, wherein the at least one performance objective comprises at least one of latency, power consumption, load balancing, deterministic routing protocol, adaptive routing protocol and use of photonic links.

4. The method of claim 1, wherein the network performance of the defined NoC configuration is compared to at least two performance objectives and the revised NoC configuration is determined using a pareto-optimization framework through adjustment of the link allocation between the plurality of n routers.

5. The method of claim 1, wherein adjustment of link allocation comprises removing an intermediate link between a first pair of routers of the plurality of n routers and adding a link between a second pair of routers of the plurality of n routers, wherein at least one router of the second pair of routers is different than routers of the first pair of routers.

6. The method of claim 1, further comprising:
   determining, by the computing device, network performance for the revised NoC configuration;
   comparing, by the computing device, the network performance of the revised NoC configuration to the at least one performance objective; and
   in response to the comparison, determining another revised NoC configuration based upon the iterative optimization of the at least one performance objective through adjustment of link allocation between the plurality of n routers.

7. The method of claim 6, further comprising:
   determining, by the computing device, network performance for the other revised NoC configuration; and
   comparing, by the computing device, the network performance of the other revised NoC configuration to the at least one performance objective.

8. The method of claim 1, wherein the NoC comprises a mesh network.

9. A method for network-on-chip (NoC) design, comprising:
   determining, by a computing device, network performance for a defined NoC configuration comprising a first number of routers interconnected through a plurality of intermediate links;
   comparing, by the computing device, the network performance of the defined NoC configuration to at least one performance objective; and in response to the comparison, determining, by the computing device, a revised NoC configuration based upon iterative optimization of the at least one performance objective through adjustment of the first number of routers to obtain a second number of routers and through adjustment of link allocation between the second number of routers.

10. The method of claim 9, wherein the iterative optimization of the at least one performance objective is a pareto-optimal optimization.

11. The method of claim 9, wherein the at least one performance objective comprises at least one of latency, power consumption, load balancing, deterministic routing protocol, adaptive routing protocol and use of photonic links.

12. The method of claim 9, wherein the network performance of the defined NoC configuration is compared to at least two performance objectives and the revised NoC configuration is determined using a pareto-optimization framework through adjustment of the link allocation between the second number of routers.

13. The method of claim 9, wherein adjustment of link allocation comprises removing an intermediate link between a first pair of routers of the first number of routers and adding a link between a second pair of routers of the first number of routers, wherein at least one router of the second pair of routers is different than routers of the first pair of routers.

14. The method of claim 9, further comprising:
determining, by the computing device, network performance for the revised NoC configuration;
comparing, by the computing device, the network performance of the revised NoC configuration to the at least one performance objective; and
in response to the comparison, determining another revised NoC configuration based upon the iterative optimization of the at least one performance objective through adjustment of link allocation between the second number of routers.

15. The method of claim 14, further comprising:
determining, by the computing device, network performance for the other revised NoC configuration; and
comparing, by the computing device, the network performance of the other revised NoC configuration to the at least one performance objective.

16. The method of claim 9, wherein adjustment of the first number of routers comprises removing a router to obtain the second number of routers.

17. The method of claim 16, wherein adjustment of link allocation comprises removing an intermediate link between a first pair of routers of the second number of routers and adding a link between a second pair of routers of the second number of routers, wherein at least one router of the second pair of routers is different than routers of the first pair of routers.

18. The method of claim 9, wherein adjustment of the first number of routers comprises adding a router to obtain the second number of routers.

19. The method of claim 18, wherein adjustment of link allocation comprises removing an intermediate link between a first pair of routers of the second number of routers and adding a link between a second pair of routers of the second number of routers, wherein at least one router of the second pair of routers is different than routers of the first pair of routers.

* * * * *